United States Patent
Van Hoorn et al.

[11] Patent Number: 6,112,944
[45] Date of Patent: Sep. 5, 2000

[54] FERRULE DELIVERY SYSTEM

[76] Inventors: Craig M. Van Hoorn; Stephen R. Swartz, Jr., both of P.O. Box 5658, Deptford, N.J. 08096

[21] Appl. No.: 09/161,001

[22] Filed: Sep. 25, 1998

[51] Int. Cl.[7] .................................................. G65G 59/06
[52] U.S. Cl. ......................... 221/298; 221/289; 221/190; 221/297; 221/312 A; 221/312 B
[58] Field of Search ................................ 221/281, 312 A, 221/312 B, 297, 298, 190, 66, 289; 29/241; 206/303, 347, 348

[56] References Cited

U.S. PATENT DOCUMENTS

| | | | |
|---|---|---|---|
| 1,800,459 | 4/1931 | Maclean . | |
| 2,220,354 | 11/1940 | Sheetz | 81/125 |
| 2,520,321 | 8/1950 | McDonald et al. | 133/5 |
| 2,624,880 | 1/1953 | Lind et al. | 221/312 A |
| 2,901,146 | 8/1959 | Powell, Jr. et al. | 221/190 |
| 3,228,555 | 1/1966 | Pinto | 221/312 A |
| 3,464,590 | 9/1969 | Giannettino | 221/297 |
| 3,773,169 | 11/1973 | Zahuranec et al. | 206/46 |
| 3,998,238 | 12/1976 | Nigro | 133/5 |
| 4,087,021 | 5/1978 | Cotugno | 221/199 |
| 4,119,243 | 10/1978 | Marecek et al. | 221/298 |
| 4,216,878 | 8/1980 | Naud | 221/264 |
| 4,239,125 | 12/1980 | Pawlowski | 221/65 |
| 4,600,118 | 7/1986 | Martin | 221/1 |
| 5,163,580 | 11/1992 | Beach et al. | 221/312 A |
| 5,335,826 | 8/1994 | Kazino | 221/297 |
| 5,704,515 | 1/1998 | Martin | 221/1 |

FOREIGN PATENT DOCUMENTS

| | | | |
|---|---|---|---|
| 141639 | 5/1935 | Australia | 221/297 |
| 558778 | 7/1977 | U.S.S.R. | 221/298 |
| 821955 | 10/1959 | United Kingdom | 221/312 A |

*Primary Examiner*—H. Grant Skaggs
*Attorney, Agent, or Firm*—Norman E. Lehrer

[57] ABSTRACT

A ferrule delivery system for placing a ferrule in a desired position on a flat surface quickly and with ease is disclosed. The system includes an elongated shaft having a tapered end and a delivery end, ferrules loaded on the outer circumference of the shaft, and two sets of ball bearings and two O-rings attached to the shaft for retaining the ferrules on the shaft and for releasing a ferrule from the shaft as needed when a plunger slidably mounted within the shaft and extending outwardly from the delivery end of the shaft is depressed. The present invention also discloses a method for loading a plurality of ferrules onto the outer circumference of the shaft easily and without much effort.

12 Claims, 3 Drawing Sheets

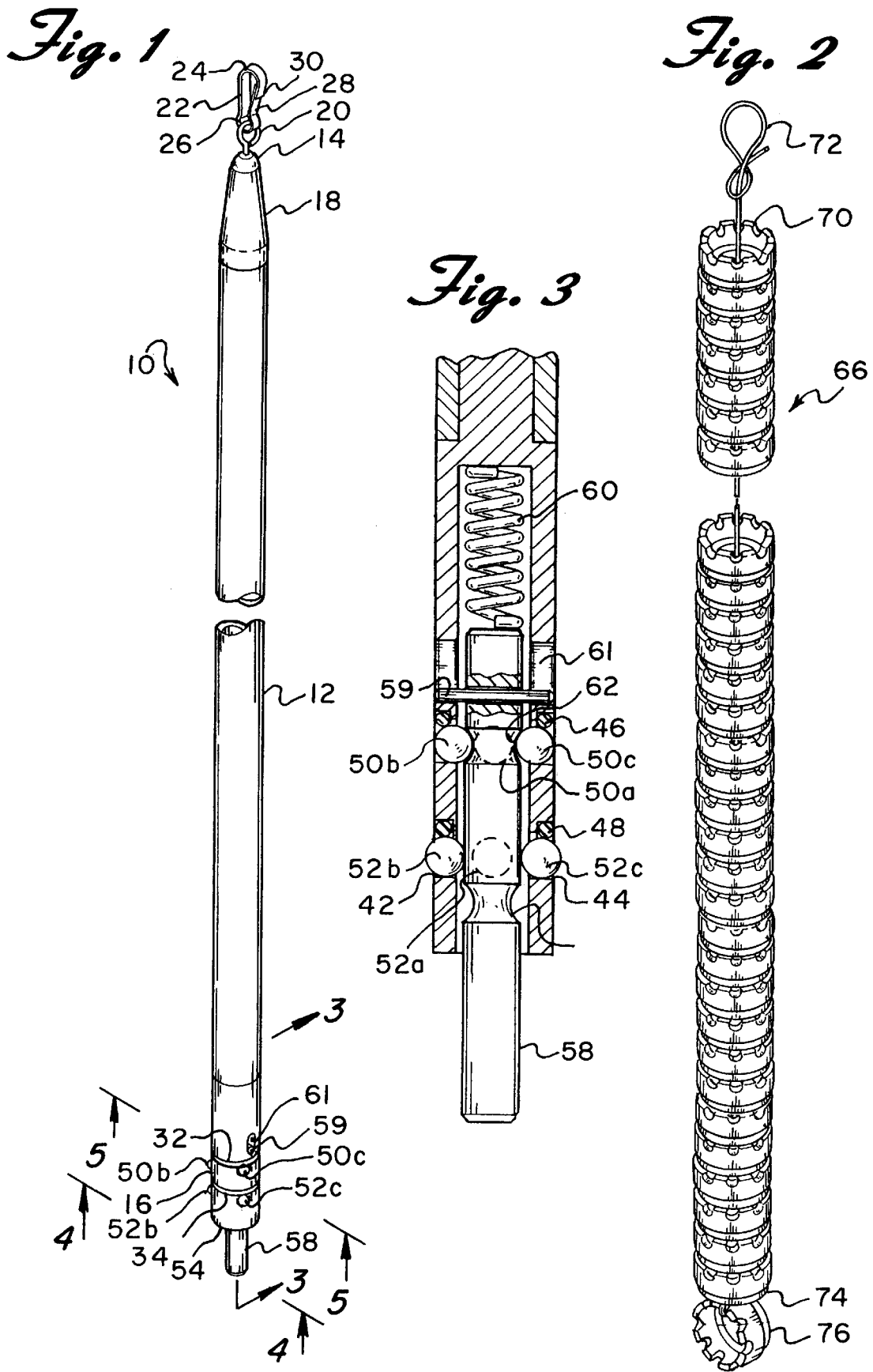

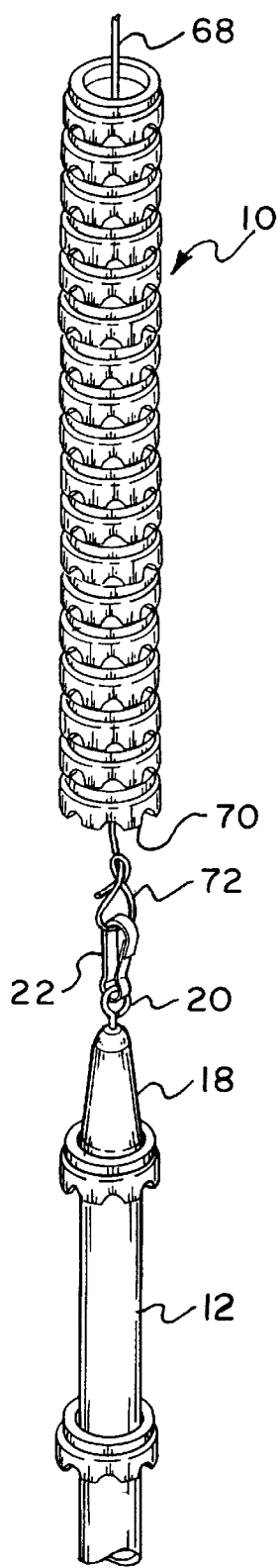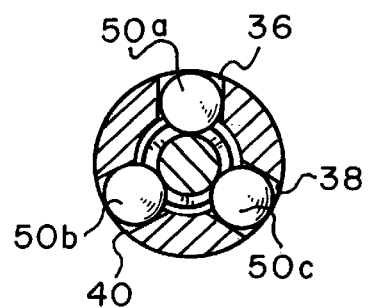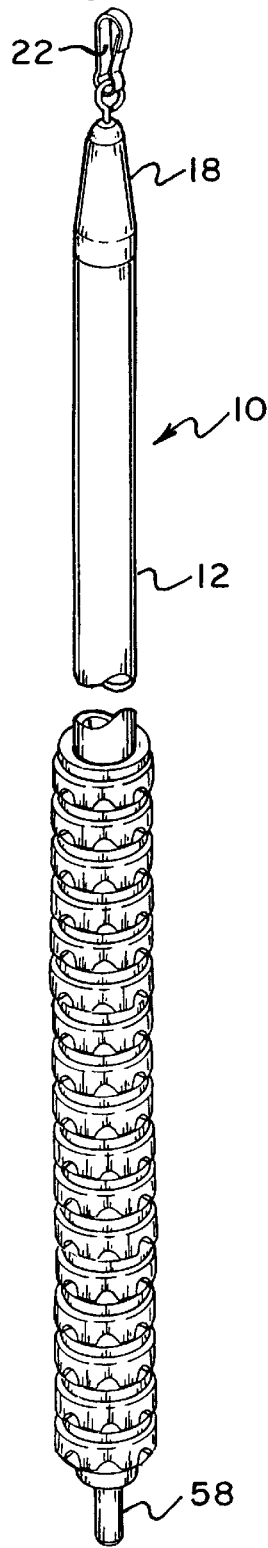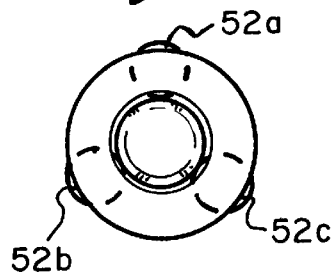

FERRULE DELIVERY SYSTEM

BACKGROUND OF THE INVENTION

The present invention is directed toward a ferrule delivery system and more particularly, toward a delivery system which aids a person to quickly and precisely place a ferrule at a desired location on a flat surface.

Ferrules are generally ceramic, ring-shaped, and have a height of an inch or less. They are commonly used in stud welding and metal working. The ferrules are positioned at predetermined locations on a flat surface, for example, a steel beam. Each ferrule surrounds a stud when the stud is being welded. As a result, the ferrule concentrates the weld heat, allows gasses to escape, and contains molten metal around the perimeter of the stud. The ferrules are usually placed in position by hand by the worker. This process, however, involves labor-intensive, tedious, expensive, and time-consuming work.

Dispensers which distribute ferrules have been disclosed in the prior art. For example, U.S. Pat. No. 4,600,118 to Martin discloses a ferrule dispenser with a rod located within the dispenser. In order to load the ferrules into the dispenser, the ferrules are first loaded into a disposable tubular magazine. The ferrules are then loaded from the magazine onto the rod within the dispenser and the magazine is discarded.

U.S. Pat. No. 5,704,515 to Martin includes a unique stack of ferrules which are particularly adapted and structured to be used with the dispenser disclosed in the patent. As a result, this ferrule dispenser is not compatible with a wide variety of ferrules. That is, the dispenser is sold with ferrules that are custom-made for the dispenser. The dispenser, therefore, is unable to accommodate ferrules of varying sizes and shapes.

SUMMARY OF THE INVENTION

The present invention is designed to overcome the deficiencies of the prior art discussed above. It is an object of the present invention to provide a ferrule delivery system which aids a person to place a ferrule in a desired position easily.

It is another object of the present invention to provide a simple method of loading ferrules onto the device.

In accordance with the illustrative embodiments demonstrating features and advantages of the present invention, there is provided a ferrule delivery system for easily placing a ferrule in a desired position including an elongated shaft having a tapered end and a delivery end, ferrules loaded on the outer circumference of the shaft, and two sets of ball bearings and two rubber O-rings attached to the shaft for retaining the ferrules on the shaft and for releasing a ferrule from the shaft as needed when a plunger slidably mounted within the shaft and extending outwardly from the delivery end of the shaft is depressed.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of the ferrule delivery device of the present invention;

FIG. 2 is a perspective view of the ferrules loaded on a wire;

FIG. 3 is cross-sectional view taken along line 3—3 of FIG. 1;

FIG. 4 is a cross-sectional view taken along line 4—4 of FIG. 1;

FIG. 5 is a cross-sectional view taken along line 5—5 of FIG. 1;

FIG. 6 is a perspective view of the ferrules being loaded onto the ferrule delivery device;

FIG. 7 is a perspective view of the ferrules loaded onto the delivery device;

DETAILED DESCRIPTION OF THE PREFERRED EMBODIMENT

Figure 8:
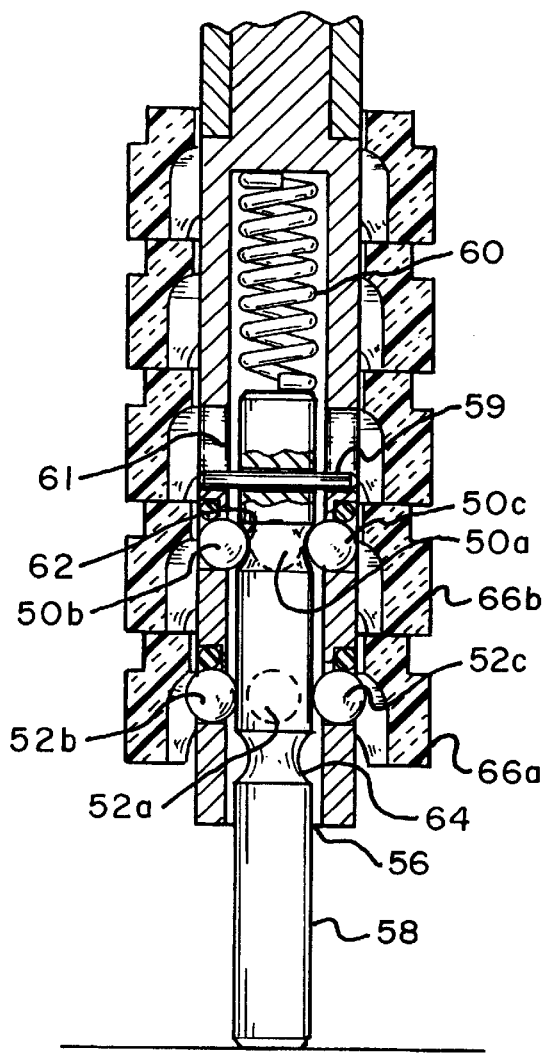
FIG. 8 is a partial cross-sectional view of the ferrule delivery device loaded with ferrules and prior to a ferrule being released.

Referring now to the drawings in detail wherein like reference numerals have been used throughout the various figures to designate like elements, there is shown in FIG. 1 a ferrule delivery system constructed in accordance with the principles of the present invention and designated generally as 10. The ferrule delivery system 10 is shown in FIG. 7 with ferrules mounted thereon.

The ferrule delivery system 10 essentially includes an elongated, cylindrical shaft 12 having a top end 14 and a bottom or delivery end 16. The shaft 12 may be made from aluminum. The top end 14 has a tapered section 18. Extending upwardly from the tapered section 18 are means for loading ferrules onto the shaft 12 which may include a metal loop 20 to which a clip 22 is attached. The clip 22 may include a hooked section 24 and a curved section 26. Extending from the curved section 26 is a somewhat flexible flange 28. The flange 28 contacts the end 30 of the hooked section 24 as seen in FIG. 1. The clip 22 is attached to the metal loop 20. While the clip 22 described above is preferred, it should be readily apparent that other clips known in the art may be used.

The delivery end 16 of the shaft 12 has an upper slot 32 and a lower slot 34 spaced approximately an inch or so apart from each other. Each of the slots 32 and 34 extends 360° around the shaft 12. Below and in communication with the upper slot 32 are three grooves or radial channels 36, 38, and 40 spaced 120° apart from each other. (See FIG. 5.) Below and in communication with the lower slot 34 are also three grooves or radial channels (seen, for example, as grooves 42 and 44) spaced 120° apart from each other. A rubber O-ring 46 is held within the upper slot 32. A set of ball bearings 50a, 50b, and 50c rest within the grooves 36, 38, and 40, respectively. (See FIG. 5.) Similarly, a rubber O-ring 48 is held within the lower slot 34 and a set of ball bearings 52b and 52c rest within the grooves 42 and 44, respectively. (See FIG. 3.) The O-ring 46 holds and limits the outer movement of the ball bearings 50a, 50b, and 50c. (See FIG. 3.) Similarly, the O-ring 48 holds and limits the outer movement of the ball bearings 52a, 52b, and 52c. (It should be noted that while the groove housing ball bearing 52a is not shown, the discussions and descriptions concerning ball bearings 52b and 52c and their respective grooves are equally applicable to the ball bearing 52a.) The above described configuration aids in alternately moving the ball bearings in radial directions as will be explained in further detail below.

The tip 54 of the delivery end 16 has an opening 56. Extending outwardly from the opening 56 is a plunger 58 which is slidably mounted within the hollow end of shaft 12 and is held in place by a biasing member such as a spring 60. (See FIG. 3.) Upper and lower movement of the plunger 58 is limited by the pin 59 which passes through the plunger and rides in guide or axially extending slot 61 in the wall of the shaft 12. The plunger 58 may also be made from aluminum and is generally cylindrical. The plunger 58 also has means for moving the ball bearings which may include an upper beveled section 62 and a lower beveled section 64. The function of the beveled sections 62 and 64 will be discussed in more detail below.

The ferrule delivery system 10 of the present invention also includes a plurality of ferrules, such as shown, for example, at 66 loaded onto a flexible wire 68. (See FIG. 2.) At one end 70 of the wire 68 a loop 72 is formed, the purpose of which will be described in greater detail below. The loop 72 should be large enough to prevent the ferrules 66 from sliding off of the wire 68. The opposite end 74 of the wire 68 has a guide ferrule 76 which may be held by a person when loading the ferrules 66 onto the elongated shaft 12.

In order to load the ferrules 66 onto the shaft 12, the loop 72 of the wire 68 is hooked onto or otherwise attached to the clip 22 of the delivery device by depressing the flange 28 of the clip 22 and inserting the loop 72 through the hooked section 24 of the clip 22. (See FIG. 6.) The loop 72 is flexible enough so that it may be manipulated to allow the ferrules to slide off of the wire 68 and onto the outer circumference of the elongated shaft 12. (See FIG. 7.) The tapered section 18 of the shaft 12 facilitates sliding the ferrules 66 onto the shaft 12 from the wire 68. The guide ferrule 76 is held by a person in order to aid the person load the ferrules onto the shaft, i.e., the guide ferrule 76 is held while the rest of the ferrules are slid onto the shaft 12 and stacked thereon.

In a normal position, the lowermost ferrule 66a rests on the ball bearings 52a–c which extend outwardly, thereby retaining all of the ferrules thereabove on the device. That is, the lower beveled section 64 of the plunger is not aligned with the lower slot 34 of the shaft 12. Therefore, the ball bearings 52a–c are forced to extend outwardly. The upper beveled section 62 of the plunger 58, on the other hand, is aligned with the upper slot 32 so that the ball bearings 50a–c rest within the upper beveled section 62 of the plunger 58. As a result, the ball bearings 50a–c are flush with the shaft 12 so that the ferrules 66 may pass over them. (See FIG. 8.)

Figure 9:
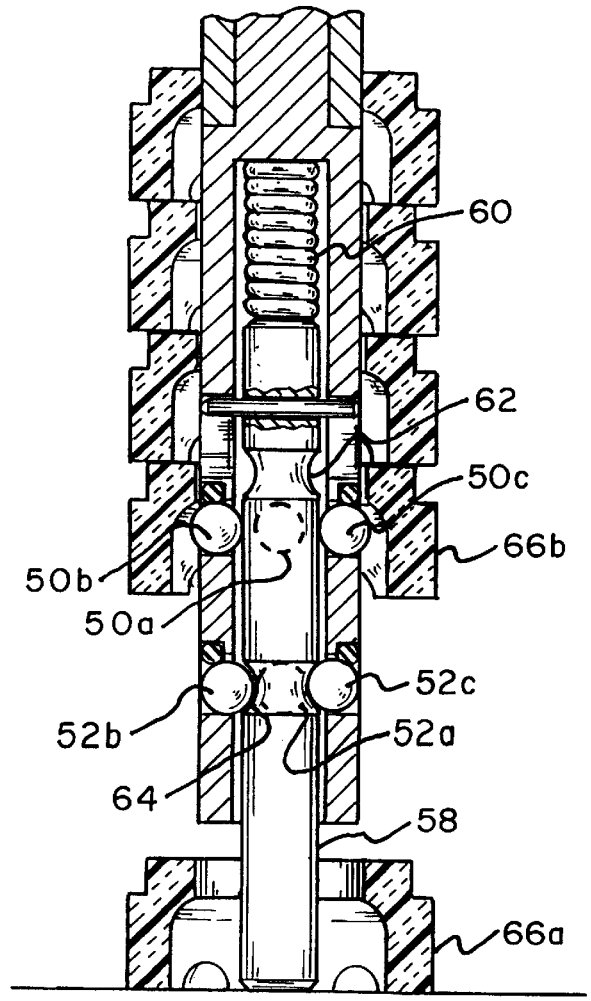
FIG. 9 is a partial cross-sectional view of a the ferrule delivery device loaded with ferrules as one ferrule is released from the device.

In order to use the delivery device, the shaft 12 is pressed downwardly. This action, in turn, forces the plunger 58 to move upwardly within the shaft 12, allowing the ball bearings 52a–c to move inwardly. That is, the lower beveled section 64 of the plunger 58 is now aligned with the lower slot 34 so that the ball bearings 52a–c rest in the lower beveled section 64 of the plunger 58. (See FIG. 9.) The ball bearings 52a–c are now flush with the shaft 12 so that the lowermost ferrule 66a passes over the ball bearings 52a–c. Simultaneously, the ball bearings 50a–c extend outwardly because the upper beveled section 62 of the plunger 58 is no longer aligned with the upper slot 32. The ball bearings 50a–c are forced out of the beveled section 62 of the plunger 58, and extend outwardly, thereby preventing all but the lowermost ferrule 66a from passing over the ball bearings 50a–c. As a result, the lowermost ferrule 66a is released while the rest of the ferules remain on the shaft 12, held in place by the ball bearings 50a–c, preventing the ferrules from being released.

Once the pressure on the plunger 58 is released, the device again assumes the normal or rest position. That is, the lower slot 34 of the shaft 12 is not in alignment with the lower beveled section 64 of the plunger 58 so that the ball bearings 52a–c extend outwardly and the next ferrule 66b rests on the lower set of ball bearings 52a–c and the rest of the ferrules 66 are retained on the shaft. Again, the upper beveled section 62 of the plunger 58 is aligned with the upper slot 32 of the shaft 12 so that the upper set of ball bearings 50a–c remains flush with shaft 12, thereby allowing the ferrules to pass over the ball bearings 50a–c.

The present invention may be embodied in other specific forms without departing from the spirit or essential attributes thereof and accordingly, reference should be made to the appended claims rather than to the foregoing specification as indicating the scope of the invention.

We claim:

1. A ferrule delivery system for placing a ferrule in a desired position on a flat surface comprising:

an elongated, cylindrical shaft having a tapered end and a delivery end;

a plurality of ferrules loaded onto the outer circumference of said shaft;

means for retaining said ferrules on said shaft near said delivery end;

means for releasing one of said plurality of ferrules from said shaft as needed; and wherein said retaining means includes an upper ball bearing and a lower ball bearing and means for alternately moving said ball bearings in radial directions.

2. The ferrule delivery system of claim 1 wherein said retaining means further includes an upper slot and a lower slot on said shaft, an O-ring resting within each of said slots, a groove in communication with said upper slot, a groove in communication with said lower slot, and each of said ball bearings resting in each one of said grooves.

3. The ferrule delivery system of claim 1 wherein said means for releasing includes a plunger slidably mounted within said shaft and extending outwardly from said delivery end of said shaft, said plunger having means for moving said ball bearings.

4. The ferrule delivery system of claim 1 wherein said tapered end of said shaft has means for loading said plurality of ferrules onto said shaft.

5. A method for loading ferrules onto a ferrule delivery device comprising the steps of:

providing an elongated shaft having a tapered end and a delivery end, said tapered end having a clip extending outwardly therefrom;

providing a plurality of ferrules loaded onto a wire;

attaching an end of said wire onto said clip; and raising said wire so that said ferrules slide onto the outer circumference of said shaft.

6. The method of loading ferrules onto a ferrule delivery device of claim 5 wherein said wire is flexible.

7. A ferrule delivery system for placing a ferrule in a desired position on a flat surface comprising:

an elongated, cylindrical shaft having a tapered end and a delivery end;

a plurality of ferrules loaded onto the outer circumference of said shaft;

means including a ball bearing for retaining said ferrules on said shaft near said delivery end, said ball bearing being moveable in a radial direction; and means for releasing one of said plurality of ferrules from said shaft as needed, said releasing means including a plunger slidably mounted within said shaft and extending outwardly from said delivery end of said shaft, said plunger having means for moving said ball bearing.

8. The ferrule delivery system of claim 7 wherein said retaining means includes an upper ball bearing and a lower ball bearing and means for alternately moving said ball bearings in radial directions.

9. The ferrule delivery system of claim 8 wherein said retaining means further includes an upper slot and a lower slot on said shaft, an O-ring resting within each of said slots, a groove in communication with said upper slot, a groove in communication with said lower slot, and each of said ball bearings resting in each one of said grooves.

10. The ferrule delivery system of claim 7 wherein said tapered end of said shaft has means for loading said plurality of ferrules onto said shaft.

11. A method for loading ferrules onto a ferrule delivery device comprising the steps of:

providing an elongated shaft having a tapered end and a delivery end, said tapered end including means for holding the end of a wire;

providing a plurality of ferrules loaded onto a wire;

attaching an end of said wire to said holding means; and raising said wire so that said ferrules slide onto the outer circumference of said shaft.

12. The method of loading ferrules onto a ferrule delivery device of claim 11 wherein said wire is flexible.

\* \* \* \* \*